US009347528B1

(12) United States Patent  (10) Patent No.: US 9,347,528 B1
Valente et al.  (45) Date of Patent: May 24, 2016

(54) TWO-SPEED EPICYCLIC GEAR ARRANGEMENT

(71) Applicant: American Axle & Manufacturing, Inc., Detroit, MI (US)

(72) Inventors: Paul J. Valente, Berkley, MI (US); James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 14/624,673

(22) Filed: Feb. 18, 2015

(51) Int. Cl.
    *F16H 3/66* (2006.01)
(52) U.S. Cl.
    CPC .......... *F16H 3/66* (2013.01); *F16H 2200/0034* (2013.01); *F16H 2200/201* (2013.01); *F16H 2200/2035* (2013.01); *F16H 2200/2082* (2013.01); *F16H 2200/2097* (2013.01)
(58) Field of Classification Search
    CPC .................. F16H 2200/201; F16H 2200/0034; F16H 2200/2082; F16H 2200/2035; F16H 2200/2097
    USPC ........................... 475/279, 286, 287, 290, 291
    See application file for complete search history.

(56) References Cited

U.S. PATENT DOCUMENTS

| 2,137,778 | A | 11/1938 | McCullough | |
|---|---|---|---|---|
| 2,725,763 | A | 12/1955 | Stoeckicht | |
| 2,848,908 | A | 8/1958 | Hollis | |
| 4,027,552 | A * | 6/1977 | Murakami | F16H 3/666 475/280 |
| 4,089,238 | A * | 5/1978 | Forster | F16H 3/66 475/276 |
| 4,089,239 | A * | 5/1978 | Murakami | F16H 3/66 475/276 |
| 4,453,430 | A | 6/1984 | Sell | |
| 4,621,541 | A | 11/1986 | Takahashi | |
| 5,277,670 | A * | 1/1994 | Tenberge | F16H 47/04 475/218 |
| 5,755,636 | A * | 5/1998 | Justice | F16H 3/66 475/275 |
| 8,303,453 | B2 * | 11/2012 | Wittkopp | F16H 3/66 475/276 |
| 8,425,369 | B2 * | 4/2013 | Wittkopp | F16H 3/666 475/275 |

* cited by examiner

*Primary Examiner* — Roger Pang

(74) *Attorney, Agent, or Firm* — Harness, Dickey & Pierce, P.L.C.

(57) ABSTRACT

A power transmitting that includes an epicyclic multi-speed transmission that employs friction to torsionally ground one or more elements of the transmission to either inhibit their rotation or to couple the elements together for common rotation. The epicyclic multi-speed transmission avoids clutch configurations that employ stationary clutch packs that are configured to exert force on a rotatable element of the transmission through a thrust bearing, as well as clutch configurations that employ a hydraulically operated piston that rotates with a clutch pack, to reduce drag force and eliminate the need for rotary seals.

10 Claims, 3 Drawing Sheets

TWO-SPEED EPICYCLIC GEAR ARRANGEMENT

FIELD

The present disclosure relates to a two-speed epicyclic gear arrangement.

BACKGROUND

This section provides background information related to the present disclosure which is not necessarily prior art.

In a multi-speed epicyclic transmission, various elements within the transmission are alternately held from rotation relative to a housing or are coupled to another element of the transmission to cause the components to co-rotate to cause the transmission to operate in the several different overall gear ratios. When one or more elements of an epicyclic transmission are coupled together to co-rotate, the coupling that is used to couple the elements together needs to rotate with the rotating elements of the transmission. If a multi-plate friction clutch were to be used to couple the elements together, it would be necessary to apply a normal force to the rotating friction clutch.

One way to apply a normal force to the rotating friction clutch is to have a stationary element that is capable of exerting a force on the friction clutch act through a thrust bearing. This solution, however, suffers from the drawback that the bearing imparts a relatively high drag force that reduces the efficiency of the transmission.

Another way to apply a normal force to the rotating friction clutch is to use a piston assembly that rotates with the friction clutch and to distribute fluid power to the piston assembly through a rotary seal. This solution, however, suffers from the drawback that the rotating seal creates drag and necessitates a continuous supply of pressurized fluid to maintain a desired pressure due to leakage.

Accordingly, there remains a need in the art for an improved multi-speed epicyclic transmission.

SUMMARY

This section provides a general summary of the disclosure, and is not a comprehensive disclosure of its full scope or all of its features.

In one form, the present disclosure provides a power transmitting that includes a housing, a transmission, a first clutch and a second clutch. The transmission is received in the housing and includes a first sun gear, a first ring gear disposed about the first sun gear, a first planet carrier, a plurality of first planet gears, a second planet carrier coupled to the first ring gear for common rotation, a second sun gear disposed about the first planet carrier, a second ring gear disposed about the second sun gear and non-rotatably coupled to the housing, a plurality of second planet gears, a third sun gear coupled to the second sun gear for common rotation, a third planet carrier coupled to the first planet carrier for common rotation, a third ring gear disposed about the third sun gear and a plurality of third planet gears. Each of the first planet gears is journally supported on the first planet carrier and is meshingly engaged with the first sun gear and the first ring gear. Each of the second planet gears is journally supported on the second planet carrier and is meshingly engaged with the second sun gear and the second ring gear. Each of the third planet gears is journally supported on the third planet carrier and is meshingly engaged to the third sun gear and the third ring gear. The first clutch is operable in a first clutch mode, in which the first ring gear is non-rotatably coupled to the housing, and a second clutch mode in which the first ring gear is rotatable relative to the housing. The second clutch is operable in a third clutch mode, in which the third ring gear is rotatable relative to the housing, and a fourth clutch mode in which the third ring gear is non-rotatable relative to the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
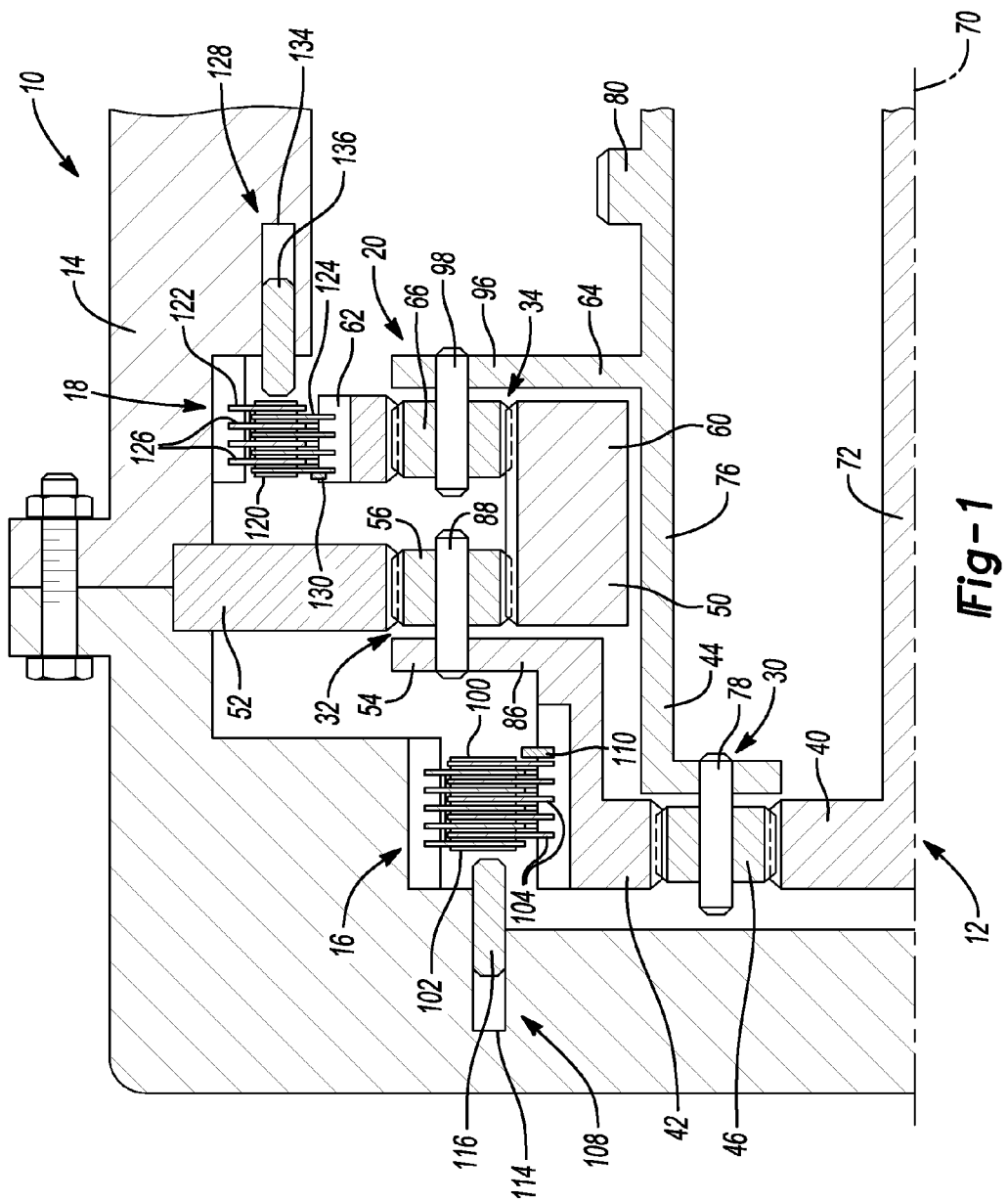
FIG. 1 is a longitudinal section view of an exemplary power transmitting device having a multi-speed epicyclic transmission that is constructed in accordance with the teachings of the present disclosure.

With reference to FIG. 1 of the drawings, an exemplary power transmitting device 10 having a multi-speed epicyclic transmission 12 that is constructed in accordance with the teachings of the present disclosure. The power transmitting device 10 can also include a housing 14, a first clutch 16 and a second clutch 18. The housing 14 can define a cavity 20 into which the transmission 12 and the first and second clutches 16 and 18 can be housed.

The transmission 12 can be received in the cavity 20 in the housing 14 and can include first, second and third planetary gearsets 30, 32 and 34, respectively. The first planetary gearset 30 can include a first sun gear 40, a first ring gear 42, a first planet carrier 44 and a plurality of first planet gears 46 (only one shown). The second planetary gearset 32 can include a second sun gear 50, a second ring gear 52, a second planet carrier 54 and a plurality of second planet gears 56 (only one shown). The third planetary gearset 34 can include a third sun gear 60, a third ring gear 62, a third planet carrier 64 and a plurality of third planet gears 66.

The first sun gear 40 can be rotatably disposed about a longitudinal axis 70 of the transmission 12 and can be the input of the transmission 12 that receives rotary power from a source of rotary power (not shown). In the particular example provided, the first sun gear 40 is integrally formed with an input shaft 72. The first ring gear 42 can be disposed about the first sun gear 40 and can include an annular body onto which a plurality of internal teeth are formed. If desired, a bearing or bushing (not shown) can be disposed between the first ring gear 42 and the housing 14. The first planet carrier 44 can include a first carrier body 76 and a plurality of first carrier pins 78 that can be coupled, e.g., fixedly coupled, to the first carrier body 76. Each of the first planet gears 46 can be rotatably received on a corresponding one of the first carrier pins 78 such that the first planet gears 46 are journally supported on the first planet carrier 44. The first planet gears 46 can be meshingly engaged with the first sun gear 40 and the first ring gear 42. The first planet carrier 44 can be an output of the transmission 10. In the particular example provided, a fourth sun gear 80 associated with another planetary reduction (not shown) is coupled to the first carrier body 76 for rotation therewith.

The second sun gear 50 can be an annular structure that can be disposed about the first carrier body 76. The second ring gear 52 can be disposed about the second sun gear 50 and can include an annular body onto which a plurality of internal teeth are formed. The second ring gear 52 can be non-rotatably coupled to the housing 14. The second planet carrier 54 can include a second carrier body 86, which can be fixedly coupled to the first ring gear 42 for common rotation, and a plurality of second carrier pins 88 that can be coupled, e.g., fixedly coupled, to the second carrier body 86. If desired, a bearing or bushing (not shown) can be disposed between the second carrier body 86 and the housing 14. Each of the second planet gears 56 can be rotatably received on a corresponding one of the second carrier pins 88 such that the second planet gears 56 are journally supported on the second planet carrier 54. The second planet gears 56 can be meshingly engaged with the second sun gear 50 and the second ring gear 52.

The third sun gear 60 can be an annular structure that can be disposed about the first carrier body 76 and can be coupled to the second sun gear 50 for common rotation. In the particular example provided, the second and third sun gears 50 and 60 are unitarily and integrally formed. If desired, a bearing or bushing (not shown) can be disposed between the first carrier body 76 and the second and third sun gears 50 and 60. The third ring gear 62 can be received about the third sun gear 60 and can include an annular body onto which a plurality of internal teeth are formed. The third planet carrier 64 can include a third carrier body 96, which can be fixedly coupled to the first carrier body 76 for common rotation, and a plurality of third carrier pins 98 that can be coupled, e.g., fixedly coupled, to the third carrier body 96. If desired, a bearing or bushing (not shown) can be disposed between the third carrier body 96 and the housing 14. Each of the third planet gears 66 can be rotatably received on a corresponding one of the third carrier pins 98 such that the third plant gears are journally supported on the third planet carrier 64. The third planet gears 66 can be meshingly engaged to the third sun gear 60 and the third ring gear 62.

The first clutch 16 can be operable in a first clutch mode, in which the first ring gear 42 is non-rotatably coupled to the housing 14, and a second clutch mode in which the first ring gear 42 is rotatable relative to the housing 14. Any desired type of clutch or coupling can be employed, such as a friction clutch. In the particular example provided, the first clutch 16 is a multi-plate friction clutch having a first clutch member 100, a second clutch member 102, a plurality of first clutch plates 104, a plurality of second clutch plates 106 and a first actuator 108. The first clutch member 100 can be non-rotatably but axially slidably mounted to the first ring gear 42. A snap ring 110 or other element that is assembled to or formed on the first ring gear 42 can limit movement of the first clutch member 100 on the first ring gear 42 along the axis 70. The second clutch member 102 can be non-rotatably but axially slidably mounted to the housing 14. The first clutch plates 104 can be non-rotatably but axially slidably coupled to the first ring gear 42. The second clutch plates 106 can be interleaved with the first clutch plates 104 and can be non-rotatably but axially slidably coupled to the housing 14. The first and second clutch plates 104 and 106 can be received between the first and second clutch members 100 and 102. The first actuator 108 can comprise any well known means for selectively applying force to the second clutch member 102 to move the second clutch member 102 toward the first clutch member 100 and cause engagement of the first and second clutch plates 104 and 106 to transfer torque therebetween. In the particular example provided, the first actuator 108 comprises a hydraulic cylinder assembly having an annular cylinder 114, which is formed in the housing 14 and an annular piston 116 that is received into the annular cylinder 114. It will be appreciated that one or more fluid conduits (not shown) can connect the annular cylinder 114 to a source of fluid power, such as a pump (not shown).

The second clutch 18 can be operable in a third clutch mode, in which the third ring gear 62 is rotatably coupled to the housing 14, and a fourth clutch mode in which the third ring gear 62 is non-rotatable relative to the housing 14. Any desired type of clutch or coupling can be employed, such as a friction clutch. In the particular example provided, the second clutch 18 is a multi-plate friction clutch having a third clutch member 120, a fourth clutch member 122, a plurality of third clutch plates 124, a plurality of fourth clutch plates 126 and a second actuator 128. The third clutch member 120 can be non-rotatably but axially slidably mounted to the third ring gear 62. A snap ring 130 or other element that is assembled to or formed on the third ring gear 62 can limit movement of the third clutch member 120 on the third ring gear 62 along the axis 70. The fourth clutch member 122 can be non-rotatably but axially slidably mounted to the housing 14. The third clutch plates 124 can be non-rotatably but axially slidably coupled to the third ring gear 62. The fourth clutch plates 126 can be interleaved with the third clutch plates 124 and can be non-rotatably but axially slidably coupled to the housing 14. The third and fourth clutch plates 124 and 126 can be received between the third and fourth clutch members 120 and 122. The second actuator 128 can comprise any well known means for selectively applying force to the fourth clutch member 122 to move the fourth clutch member 122 toward the third clutch member 120 and cause engagement of the third and fourth clutch plates 124 and 126 to transfer torque therebetween. In the particular example provided, the second actuator 128 comprises a hydraulic cylinder assembly having an annular cylinder 134, which is formed in the housing 14 and an annular piston 136 that is received into the annular cylinder 134. It will be appreciated that one or more fluid conduits (not shown) can connect the annular cylinder 134 to a source of fluid power, such as a pump (not shown).

The first clutch 16 can be operated in the first clutch mode (so that the first ring gear 42 does not rotate relative to the housing 14) and the second clutch 18 can be operated in the third clutch mode (to permit rotation of the third ring gear 62 relative to the housing 14) so that the transmission 12 provides a first overall reduction ratio.

The first clutch 16 can be operated in the second clutch mode (so that the first ring gear 42 is rotatable relative to the housing 14) and the second clutch 18 can be operated in the fourth clutch mode (to inhibit rotation of the third ring gear 62 relative to the housing 14) so that the transmission 12 provides a second overall reduction ratio.

From the foregoing, it will be appreciated that the first overall reduction is dictated by the reduction ratio of the first planetary gearset 30, and that that the second and third reduction gearsets 32 and 34 are employed solely to selectively lock the first ring gear 42 to the first planet carrier 44 so that the second overall reduction ratio is 1:1.

Figure 2:
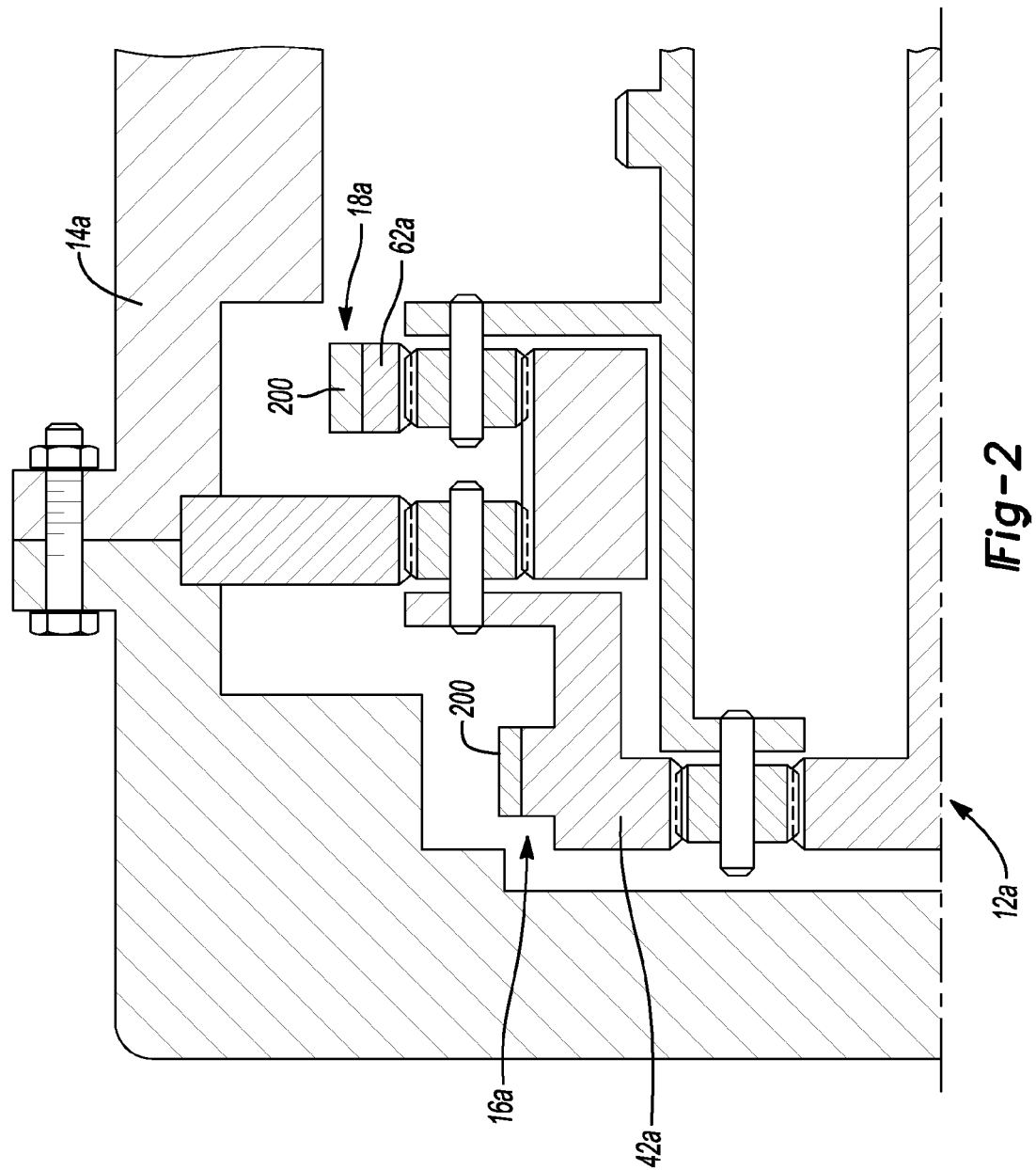
FIG. 2 is a section view similar to that of FIG. 1 but depicting a second multi-speed epicyclic transmission constructed in accordance with the teachings of the present disclosure.

While the first and second clutches 16 and 18 have been described as being multi-plate friction clutches, it will be appreciated that one or both of these clutches can be configured differently. For example, one or both of the first and second clutches 16a and 18a can be a band clutch having a clutch band 200 that can be coupled to the housing 14a and disposed about the first ring gear 42a or the third ring gear 62a as is shown in FIG. 2. The clutch band(s) 200 can be selectively tightened to apply a frictional force to the outer perimeter of the first ring gear 42a and/or the third ring gear 62a to resist rotation of the first ring gear 42a and/or the third ring gear 62a relative to the housing 14a. Operation of the transmission 12a is similar to that of the transmission 12 of FIG. 1.

Figure 3:
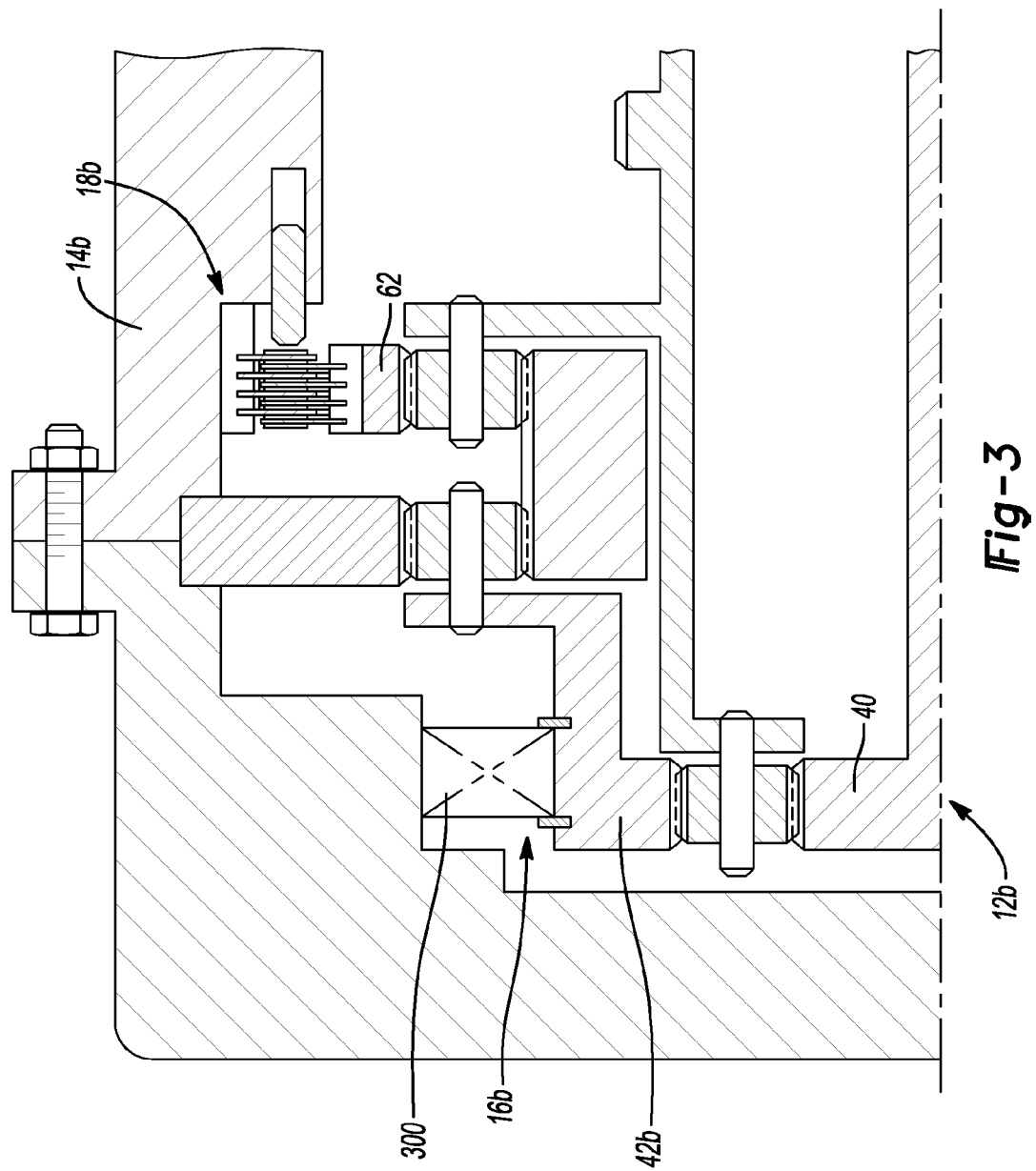
FIG. 3 is a section view similar to that of FIG. 1 but depicting a third multi-speed epicyclic transmission constructed in accordance with the teachings of the present disclosure.

Another alternative is shown in FIG. 3 in which the first clutch 16b comprises a one-way clutch, such as a sprag clutch 300, which is configured to permit rotation of the first ring gear 42b in a first rotational direction, and to inhibit rotation of the first ring gear 42b in a second rotational direction that is opposite the first rotational direction. When rotary power is input to the first sun gear 40 in a predetermined rotational direction and the second clutch 18 operates in the third clutch mode (so that the third ring gear 62 rotates relative to the housing 14), a torque reaction acting on the first ring gear 42b will be applied in a first rotational direction. The sprag clutch 300 is configured to inhibit rotation of the first ring gear 42b in the first rotational direction and consequently, the transmission 12b will operate in the first overall reduction ratio. When rotary power is input to the first sun gear 40 in the predetermined rotational direction and the second clutch 18 operates in the fourth clutch mode (so that the third ring gear 62 does not rotate relative to the housing 14), a torque reaction acting on the first ring gear 42b will be applied in a second rotational direction that is opposite the first rotational direction. The sprag clutch 300 is configured to permit rotation of the first ring gear 42b in the second rotational direction and consequently, the transmission 12b will operate in the second overall reduction ratio.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting device comprising:
   a housing;
   a transmission received in the housing, the transmission having:
      a first sun gear;
      a first ring gear disposed about the first sun gear;
      a first planet carrier;
      a plurality of first planet gears, each of the first planet gears being journally supported on the first planet carrier and meshingly engaged with the first sun gear and the first ring gear;
      a second planet carrier coupled to the first ring gear for common rotation;
      a second sun gear disposed about the first planet carrier;
      a second ring gear disposed about the second sun gear, the second ring gear being non-rotatably coupled to the housing;
      a plurality of second planet gears, each of the second planet gears being journally supported on the second planet carrier and meshingly engaged with the second sun gear and the second ring gear;
      a third sun gear coupled to the second sun gear for common rotation;
      a third planet carrier coupled to the first planet carrier for common rotation;
      a third ring gear disposed about the third sun gear; and
      a plurality of third planet gears, each of the third planet gears being journally supported on the third planet carrier and being meshingly engaged to the third sun gear and the third ring gear;
   a first clutch that is operable in a first clutch mode, in which the first ring gear is non-rotatably coupled to the housing, and a second clutch mode in which the first ring gear is rotatable relative to the housing; and
   a second clutch that is operable in a third clutch mode, in which the third ring gear is rotatable relative to the housing, and a fourth clutch mode in which the third ring gear is non-rotatable relative to the housing.

2. The power transmitting device of claim 1, wherein the first clutch comprises a friction clutch.

3. The power transmitting device of claim 2, wherein the friction clutch comprises a plurality of first clutch plates, which are non-rotatably coupled to the housing, and a plurality of second clutch plates that are non-rotatably coupled to the first ring gear.

4. The power transmitting device of claim 2, wherein the friction clutch comprises a band that is disposed about the first ring gear.

5. The power transmitting device of claim 1, wherein the first clutch is a one-way clutch.

6. The power transmitting device of claim 1, wherein the operation of the first clutch in the first and second clutch modes is responsive to a rotational direction of a net rotational force that is applied to the first ring gear.

7. The power transmitting device of claim 1, wherein the second clutch comprises a friction clutch.

8. The power transmitting device of claim 7, wherein the friction clutch comprises a plurality of first clutch plates, which are non-rotatably coupled to the housing, and a plurality of second clutch plates that are non-rotatably coupled to the third ring gear.

9. The power transmitting device of claim 7, wherein the friction clutch comprises a band that is disposed about the third ring gear.

10. The power transmitting device of claim 1, wherein the first planet carrier is coupled for rotation with an output member of the transmission.

* * * * *